United States Patent
Chen et al.

(10) Patent No.: US 9,621,908 B2
(45) Date of Patent: Apr. 11, 2017

(54) DYNAMIC LOAD BALANCING FOR VIDEO DECODING USING MULTIPLE PROCESSORS

(75) Inventors: Ding-Yun Chen, Taipei (TW);
Cheng-Tsai Ho, Taichung (TW);
Chi-Cheng Ju, Hsinchu (TW);
Chung-Hung Tsai, Hsinchu (TW)

(73) Assignee: MEDIATEK INC., Hsin-chu (TW)

( * ) Notice: Subject to any disclaimer, the term of this patent is extended or adjusted under 35 U.S.C. 154(b) by 636 days.

(21) Appl. No.: 13/602,193

(22) Filed: Sep. 2, 2012

(65) Prior Publication Data

US 2013/0058412 A1  Mar. 7, 2013

Related U.S. Application Data

(60) Provisional application No. 61/531,183, filed on Sep. 6, 2011.

(51) Int. Cl.
*H04N 19/436* (2014.01)
*H04N 19/61* (2014.01)

(52) U.S. Cl.
CPC .......... *H04N 19/436* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 5,557,332 A * | 9/1996 | Koyanagi et al. | 375/240.16 |
| 6,252,917 B1 * | 6/2001 | Freeman | 375/340 |
| 7,533,075 B1 * | 5/2009 | Soferman et al. | 706/52 |
| 2003/0014264 A1 * | 1/2003 | Fujii et al. | 704/500 |
| 2004/0091051 A1 * | 5/2004 | Youn | 375/240.25 |
| 2005/0249289 A1 * | 11/2005 | Yagasaki et al. | 375/240.18 |
| 2005/0262509 A1 * | 11/2005 | Kelly | G06F 9/5061 |
| | | | 718/104 |
| 2008/0005392 A1 * | 1/2008 | Amini et al. | 710/29 |

(Continued)

OTHER PUBLICATIONS

J. Eijndhoven, J. Hoogerbrugge, M.N. Jayram, P. Strayers and A. Terechko, "Cache-Coherent Heterogenyous Multiprocessing as Basis for Streaming Applications", Dynamic and Robust Streaming in and between Connected Consumer-Electronic Devices, vol. 3, pp. 61-80, SpringerLink, 2005.

(Continued)

*Primary Examiner* — Peter D Le
(74) *Attorney, Agent, or Firm* — Oblon, McClelland, Maier & Neustadt, L.L.P.

(57) ABSTRACT

A method and computer readable medium storing a corresponding computer program for decoding a video bitstream based on processors using dynamic load balancing are disclosed. In one embodiment of the present invention, the method configures multiple processors to perform the multiple processing modules including a prediction module by mapping the multiple processing modules to the multiple processors. One or more buffer queues are used among said multiple processing modules and the mapping the prediction module to the multiple processors is based on the level of the buffer queue. The multiple processors may correspond to a multi-core Central Processing Unit (CPU) comprising of multiple CPUs or a multi-core Digital Signal Processor (DSP) comprising of multiple DSPs to practice the present invention.

24 Claims, 12 Drawing Sheets

(56) References Cited

U.S. PATENT DOCUMENTS

2009/0049281 A1* 2/2009 Kim et al. .................. 712/220

OTHER PUBLICATIONS

F. H. Seitner, R. M. Schreier, M. Bleyer and M. Gelautz, "A macroblock-level analysis on the dynamic behaviour of an H.264 decoder", Proc. of IEEE Intl. Symp. on Consumer Electronics (ISCE), pp. 1-5, Jun. 2007.
F. H. Seitner, M. Bleyer, M. Gelautz, R. M. Beuschel, "Development of a High-Level Simulation Approach and Its Application to Multicore Video Decoding", IEEE Trans. on Circuits and Systems for Video Technology, vol. 19, No. 11, pp. 1667-1679, Nov. 2009.
Y. Kim, J.-T. Kim, S. Bae, H. Baik and H. J. Song, "H.264 decoder on embedded dual core with dynamically load-balanced functional partitioning", Proc. of IEEE Intl. Conf. on Multimedia and Expo (ICME), pp. 1001-1004, Apr. 2008.
M. Kim, J. Song, D. Kim and S. Lee, "H.264 decoder on embedded dual core with dynamically load-balanced functional paritioning", Proc. of IEEE Intl. Conf. on Image Processing (ICIP), pp. 3749-3752, Sep. 2010.
E. B. Van Der Tol, E. G.T. Jaspers, and R. H. Gelderblom, "Mapping of H.264 decoding on a multiprocessor architecture", Proc. of the SPIE, vol. 5022, pp. 707-718, May 2003.
C. Meenderinck, A. Azevedo, M. Alvarez, B. Juurlink and A. Ramirez, "Parallel Scalability of H.264", Proc. of workshop on Programmability issues for multicore computers (MULTIPROG), Jan. 2008.
K. Nishihara, A. Hatabu and T. Moriyoshi, "Parallelization of H.264 video decoder for embedded multicore processor", Proc. of IEEE Intl. Conf. on Multimedia and Expo (ICME), pp. 329-332, Apr. 2008.
K.-H. Sihn, H. Baik, J.-T. Kim, S. Bae and H. J. Song, "Novel approaches to parallel H.264 decoder on symmetric multicore systems", Proc. of IEEE Intl. Conf. on Acoustics, Speech and Signal Processing (ICASSP), pp. 2017-2020, Apr. 2009.
Seitner, Florian H.; Schreier, Ralf M.; Bleyer, Michael; Gelautz, Margrit , "A high-level simulator for the H.264/AVC decoding process in multi-core systems", Multimedia on Mobile Devices 2008. Edited by Creutzburg, Reiner; Takala, Jarmo H. Proceedings of the SPIE, vol. 6821, pp. 682105-682105-12 (2008).
M. Alvarez, A. Ramirez, A. Azevedo, C. Meenderinck, B. Juurlink, and M. Valero. Scalability of Macroblock-level Parallelism for H.264 Decoding. In Proc. Int. Conf. on Parallel and Distributed Systems, 2009.
Kue-Hwan Sihn et al., "Novel Approaches to Parallel H.264 Decoder on Symmetric Multicore Systems", Acoustics, Speech and signal Processing, 2009, ICASSP 2009, IEEE International Conference on Year: 2009, pp. 2017-2020.
Erik B. van der Tol et al., "Mapping of H.264 decoding on a multiprocessor architecture", SPIE 5022, Image and Video Communication and processing 2003, (May 7, 2003); doi:10.1117/12.476234.

\* cited by examiner

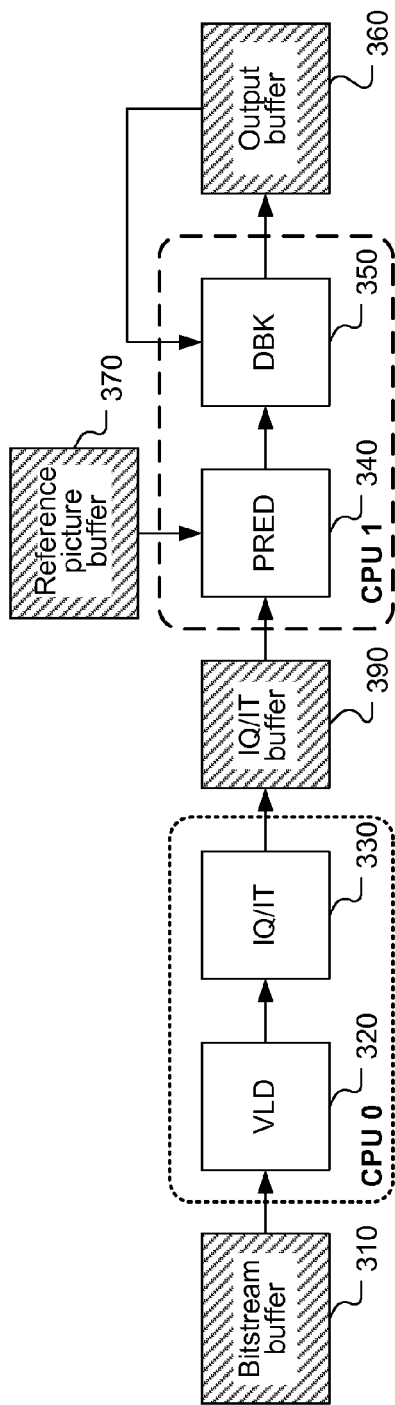
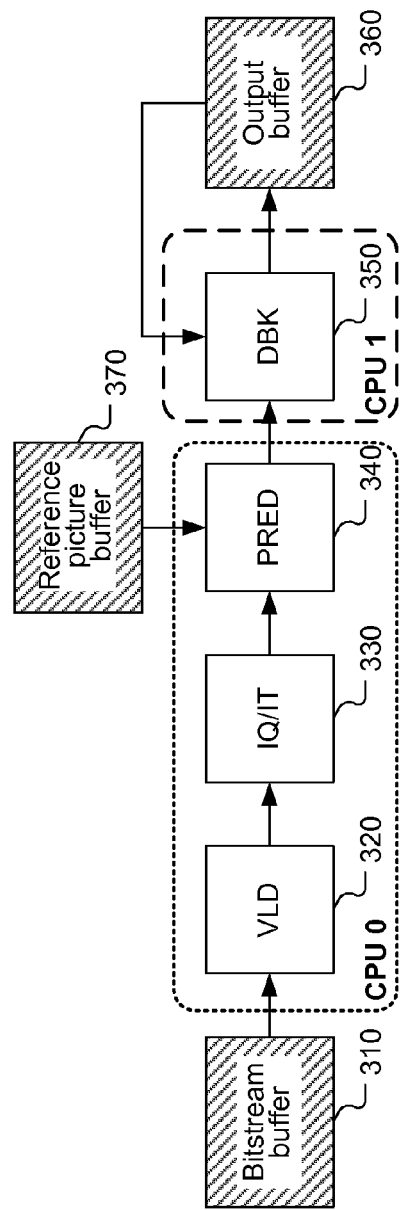
Fig. 3B
Fig. 3C

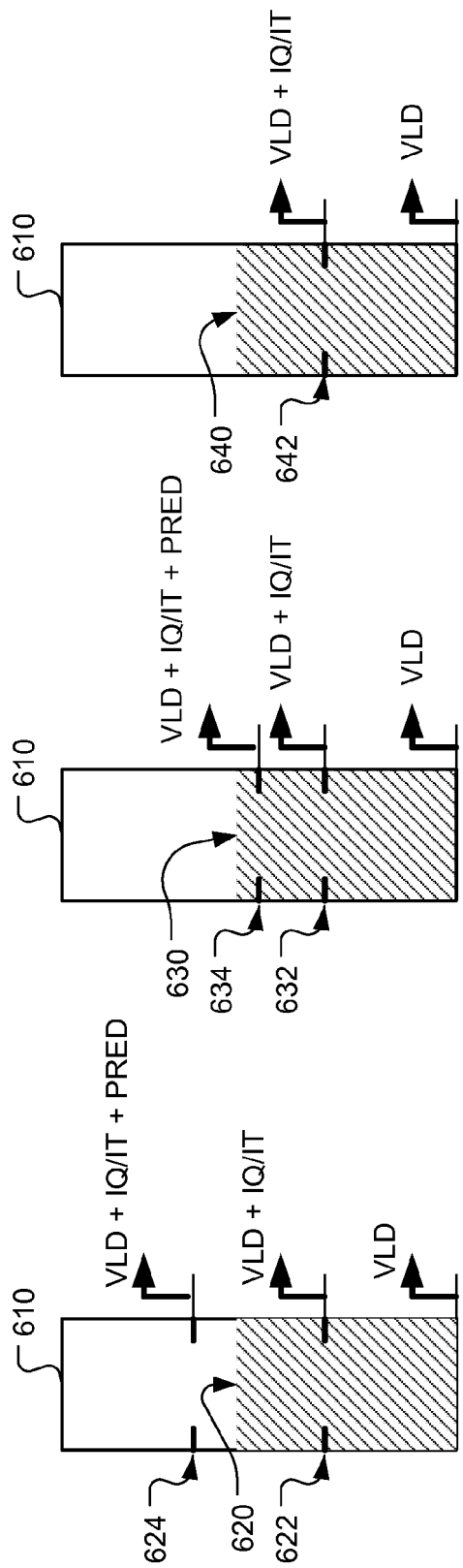

DYNAMIC LOAD BALANCING FOR VIDEO DECODING USING MULTIPLE PROCESSORS

CROSS REFERENCE TO RELATED APPLICATIONS

The present invention claims priority to U.S. Provisional Patent Application Ser. No. 61/531,183, filed on Sep. 6, 2011, entitled "A Novel Parallel H.264 Decoder Using Dynamic Load Balance on Dual Core Embedded System". The U.S. Provisional Patent Application is hereby incorporated by reference in its entirety.

FIELD OF THE INVENTION

The present invention relates to video decoding system. In particular, the present invention relates to dynamic load balancing for video decoding using multiple processors.

BACKGROUND

Compressed video has been widely used nowadays in various applications, such as video broadcasting, video streaming, and video storage. The video compression technologies used by newer video standards are becoming more sophisticated and require more processing power. On the other hand, the resolution of the underlying video is growing to match the resolution of high-resolution display devices and to meet the demand for higher quality. For example, compressed video in High-Definition (HD) is becoming a trend. The requirement of processing power for HD contents increases with the spatial resolution. Accordingly, processing power for higher resolution video is becoming a challenging issue for hardware based and software based implementation.

In order to fulfill the computational power requirement for high resolution and/or more sophisticated coding standards, high speed processor and/or multiple processors have been used to perform real-time video decoding. For example, in the personal computer (PC) and consumer electronics environment, a multi-core Central Processing Unit (CPU) may be used to decode video bitstream. The multi-core system may be in a form of embedded system for cost saving and convenience. The existing single thread software that is intended for single processor may not be suitable for multi-core system due to the data dependency nature of video coding. In order to improve the performance and reduce system cost of multi-core system based on existing single thread software, the parallel algorithms need to take into account the characteristic of underlying video coding technology. Common issues encountered in parallel algorithm design include load balancing, synchronization overhead, memory access contention, etc. In embedded systems, the communication buffer size is also an important issue because the embedded systems have limited memory and bandwidth.

Most existing video standards are not designed for parallel processing. Often, data dependencies exist in various stages of processing. Several parallel algorithms of video decoders are proposed to avoid data dependencies. For example, in MPEG-2 and H.264/AVC standards, motion compensation for a current macroblock (MB) relies on one or two reference macroblocks from one or two previously processed pictures. Furthermore, in H.264/AVC, the Intra-prediction and Motion Vector Prediction (MVP) rely on neighboring blocks. The frame level partitioning is not suitable due to Inter prediction and buffer size limitation in embedded systems. The open source software FFmpeg supports MPEG-2, MPEG-4 and H.264 coding standards and also supports slice level partitioning. However, only MPEG-2 format in FFmpeg is useful for multi-core systems since only MPEG-2 standard defines each MB row as an individual slice. Other video standards, such as MPEG-4 and H.264 do not have the option for multiple slices within a frame. Most commercial bitstreams are configured to process each frame as a slice. Therefore, the slice level partitioning does not help to speed-up decoding in a multi-core system since one slice is equivalent to one frame in most cases. Furthermore, the frame based partition does not help to alleviate the large buffer requirement.

To take potential advantage of a multi-core system, it is desirable to process the video in a smaller unit, such as macroblock level processing. For macroblock level partitioning, the system still needs to take care of data dependencies of spatial neighboring blocks, i.e., the left, top-left, top and top-right macroblocks. Local storage may be needed for buffering information associated with spatial neighboring blocks for bandwidth efficiency and lower power consumption. The reference picture buffer associated with Inter-prediction will still be needed since on-chip frame memory may cause substantial cost increase. Nevertheless, the data dependencies of macroblock level processing still pose a challenge to the parallel algorithm design for video decoder.

In FIG. 1, an exemplary system block diagram for H.264 decoder is shown. The video bitstream is first processed by entropy decoder or variable length decoder 110 (VLD) to recover code symbols. The entropy decoder 110 may also include a bitstream parser to extract respective information for various processing modules. For example, spatial prediction mode and associated information may be extracted and provided to Intra Prediction 160 and motion vector and mode information may be extracted and provided to Motion Compensation (MC) 170. The coded residue information is provided to Inverse Quantization (IQ) 120 and further processed by Inverse Transform (IT) 130. The recovered residues from IT 130 are combined with the predictor selected from Intra Prediction 160 and MC 170 to form reconstructed video data. The selection between Intra Prediction 160 and MC 170 is controlled by switch 190 based on whether the underlying video data is processed in Intra mode or Inter mode. The reconstructed video data is further process by an in-loop filter, i.e. Deblocking Filter 150 to enhance visual quality. The deblocked video data is stored in Reference Picture Buffer 180 for motion compensation of subsequent video data. The H.264 decoder system shown in FIG. 1 may be configured differently.

In a single-core system as shown in FIG. 2, the decoding process can be implemented using single threshold software. The decoding process is divided into multiple processing modules including VLD 220, IQ/IT 230, PRED (Prediction) 240, and DBK 250. The PRED 240 is responsible for both Intra Prediction 160 and Motion Compensation 170 of FIG. 1. As mentioned before, buffer required for incoming bitstream 210 and Reference picture 270 usually are sizeable and off-chip memory is used to reduce chip cost. The deblocking process (DBK 250) for a current macroblock also relies on neighboring macroblocks. An output buffer 260 is used, as shown in FIG. 2, to store decoded video frame for displaying the video frame on a display screen after decoding. While separate buffers are shown in FIG. 2, these buffers may be aggregated so that a single memory device may be used.

Various parallel algorithms exist and can be divided into three categories: functional partitioning, data partitioning and mixed partitioning. The functional partitioning takes each thread as a distinct function in a pipelined fashion, and communicates between tasks in an explicit way. Each function is decomposed into tasks, which can be executed in parallel on a multiprocessor system. The data partitioning use different threads to execute the same function for different parts of input data simultaneously. The mixed partitioning combines the functional partitioning and data partitioning, and processes functional parallelism at coarse granularity and applies data parallelism within those granularities. In embedded systems, a major problem of data partitioning and mixed partitioning is communication buffer size. The data partitioning needs a VLD buffer with a size corresponding to two full frames, and the mixed partitioning needs a VLD buffer and prediction buffer with a size corresponding to three full frames. In a non-patent literature by van der Tol, et al. (E. B. van der Tol, E. G. T. Jaspers, and R. H. Gelderblom, "Mapping of H.264 decoding on a multiprocessor architecture", *Proc. of the SPIE*, vol. 5022, pp. 707-718, May 2003), and a non-patent literature by Meenderinck et al. (C. Meenderinck, A. Azevedo, M. Alvarez, B. Juurlink and A. Ramirez, "Parallel Scalability of H.264", Proc. of workshop on Programmability Issues for Multicore Computers (MULTIPROG), January 2008), buffer requirement for data partitioning is discussed. In a non-patent literature by Nishihara et al. (K. Nishihara, A. Hatabu and T. Moriyoshi, "Parallelization of H.264 video decoder for embedded multicore processor", *Proc. of IEEE Intl. Conf on Multimedia and Expo* (ICME), pp. 329-332, April 2008), and a non-patent literature by Sihn et al. (K.-H. Sihn, H. Baik, J.-T. Kim, S. Bae and H. J. Song, "Novel approaches to parallel H.264 decoder on symmetric multi-core systems", *Proc. of IEEE Intl. Conf. on Acoustics, Speech and Signal Processing* (ICASSP), pp, 2017-2020, April 2009), buffer requirement for mixed partitioning is discussed.

For functional partitioning, a method to divide the video decoder functionality into a parsing part and a reconstruction part for dual-core environment is disclosed by Seitner et al. in two separate non-patent literatures (F. H. Seitner, R. M. Schreier, M. Bleyer and M. Gelautz, "A macroblock-level analysis on the dynamic behaviour of an H.264 decoder", *Proc. of IEEE Intl. Symp. on Consumer Electronics* (ISCE), pp. 1-5, June 2007 and F. H. Seitner, M. Bleyer, M. Gelautz, R. M. Beuschel, "Development of a High-Level Simulation Approach and Its Application to Multicore Video Decoding", *IEEE Trans. on Circuits and Systems for Video Technology*, vol. 19, no. 11, pp. 1667-1679, November 2009). A high level simulation is also proposed by Seitner et al. to estimate the performance. Y. Kim et al., (Y. Kim, J.-T. Kim, S. Bae, H. Baik and H. J. Song, "H.264 decoder on embedded dual core with dynamically load-balanced functional partitioning", *Proc. of IEEE Intl. Conf. on Multimedia and Expo* (ICME), pp. 1001-1004, April 2008) proposed dynamic load balancing in functional partitioning, which off-loads the motion compensation to another core if the previous macroblock is in a bi-directional Inter prediction mode. However, quarter frame buffer size is required for their pipeline structure. M. Kim et al., (M. Kim, J. Song, D. Kim and S. Lee, "H.264 decoder on embedded dual core with dynamically load-balanced functional partitioning", *Proc. of IEEE Intl. Conf. on Image Processing* (ICIP), pp. 3749-3752, September 2010) disclosed a dynamic load balancing method for functional partitioning based on a dual-core DSP. The system consists of a dual-core DSP, VLD hardware, MC hardware, deblocking hardware and a SDRAM. The dual-core DSP only handles some selected parts of video decoder flow. It is desirable to develop an improved functional partitioning based scheme that can further enhance performance and reduce buffer requirement.

BRIEF SUMMARY OF THE INVENTION

A method and computer readable medium storing a corresponding computer program for decoding a video bitstream based on processors using dynamic load balancing are disclosed. In one embodiment of the present invention, the method configures multiple processors to execute multiple processing modules including a prediction module by mapping the multiple processing modules to the multiple processors. One or more buffer queues are used among said multiple processing modules and the mapping of the prediction module to the multiple processors is based on the level of the buffer queue. In one example, the mapping of the prediction module to the multiple processors is based on different levels of said one or more buffer queues. The prediction module comprises an Intra prediction sub-module, an Inter prediction sub-module, motion vector determination and Intra mode determination. The output data after processing by the prediction module is stored in said one or more buffer queues. The decoding the video bitstream can be performed on a macroblock basis. In this case, if the multiple processing modules further comprise a variable Length Decoder (VLD) module, then motion vector determination and Intra mode determination of the prediction module and the VLD module associated with each macroblock are performed on a same processor of the multiple processors. When the multiple processing modules comprise a deblocking module to perform deblocking process on video data processed by the prediction module, and Intra prediction of the prediction module refers to the video data above each macroblock processed by the prediction module before the deblocking process, then the deblocking module is performed on each macroblock later than the prediction module by at least one macroblock row according to one embodiment. In another embodiment, instead of delaying the deblocking process, previous pixels processed by the prediction module can be backed up before the deblocking module is performed on each macroblock, and wherein the previous pixels comprise bottom pixels of proceeding macroblocks and the number of proceeding macroblocks is at least one macroblock row. In order to increase the processing efficiency, if an Intra macroblock is assigned to one of said multiple processors, all subsequent Intra macroblocks of said Intra macroblock in the same macroblock row are assigned to one of the said multiple processors. One aspect of the present invention addresses system configuration to support dynamic load balancing. In one embodiment, the multiple processors can be based on multiple load configurations, wherein switching among the multiple load configurations is based on the level of said one or more buffer queues. The multiple processors may correspond to a multi-core Central Processing Unit (CPU) comprising multiple CPUs or a multi-core Digital Signal Processor (DSP) comprising multiple DSPs to practice the present invention.

BRIEF DESCRIPTION OF THE DRAWINGS

FIGS. 3A-3C illustrate three examples with fixed load configuration using a dual-core CPU.

FIG. 6A illustrates exemplary thresholds for dynamic load balancing for an Inter macroblock.

FIG. 6B illustrates exemplary thresholds for dynamic load balancing for an Intra macroblock.

FIG. 6C illustrates exemplary thresholds for dynamic load balancing for an Intra macroblock, where Intra prediction is always performed by the second CPU.

DETAILED DESCRIPTION OF THE INVENTION

Figure 1:
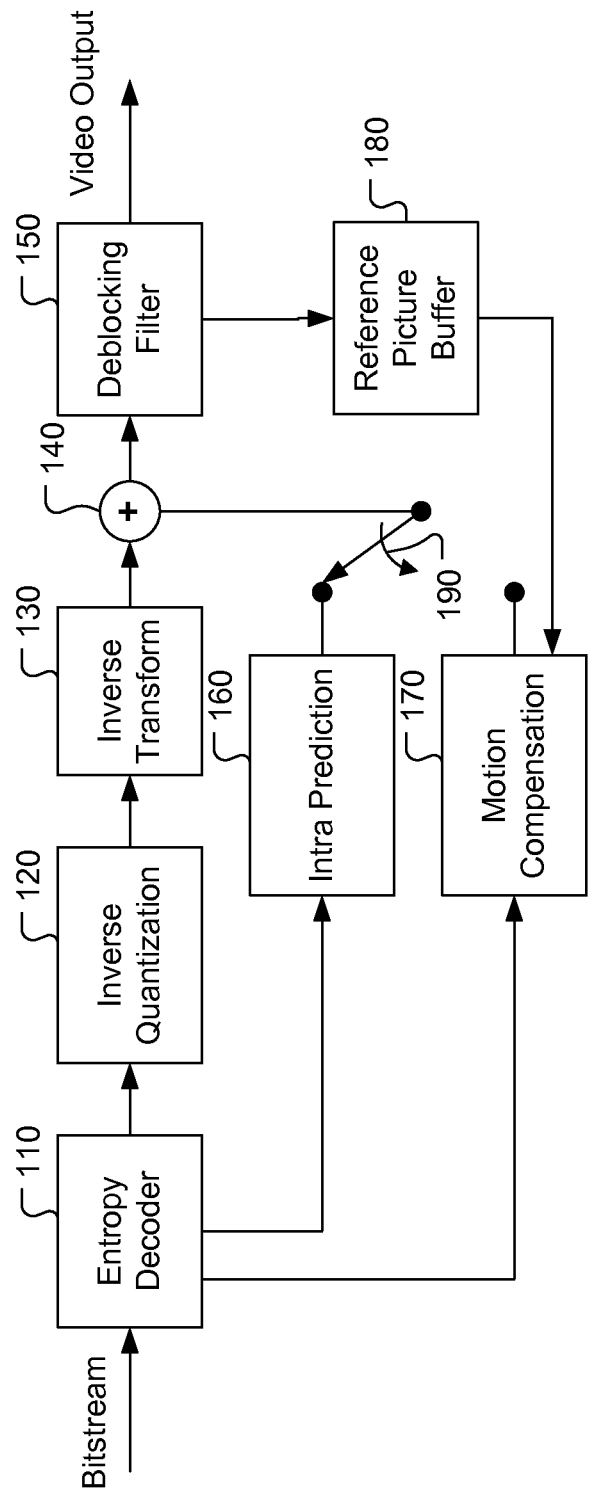
FIG. 1 illustrates an exemplary H.264 video decoding system incorporating various video decoding tasks.
Figure 2:
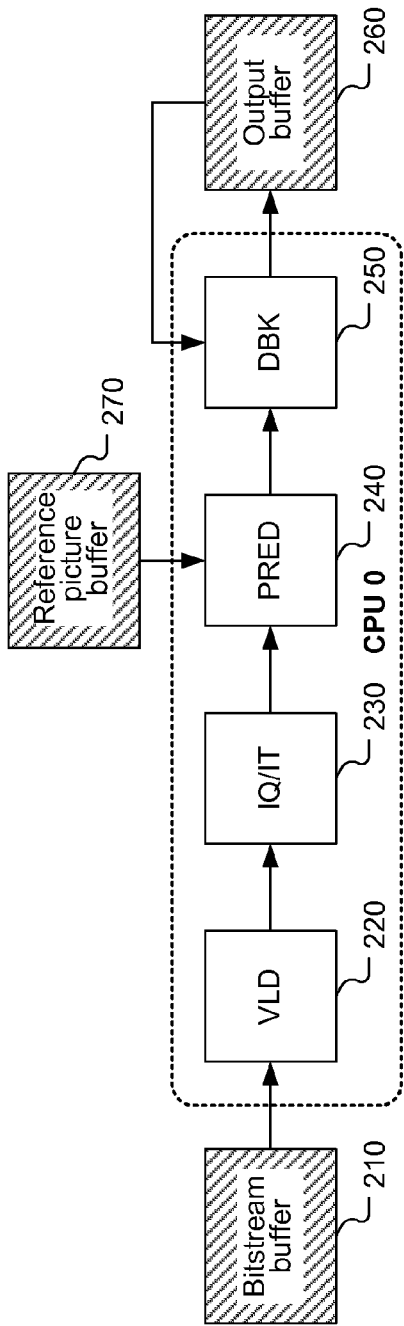
FIG. 2 illustrates an example of a single thread implementation of H.264 decoding based on a single-core CPU.
Figure 3A:
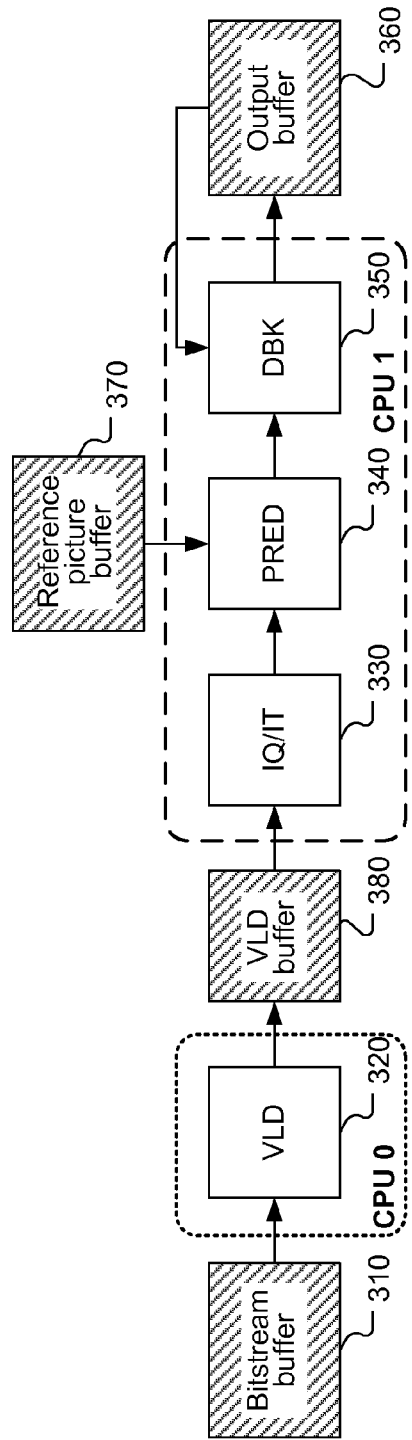

In an embodiment of the present invention, the video decoding flow is divided into an entropy decoding module (VLD), an inverse quantization/transformation module (IQ/IT), a prediction module (PRED) and a deblocking module (DBK). While the decoding process is divided into four processing modules (also called tasks) as an example, the decoding process may also be divided into other processing modules as well. A dual-core system is used as an exemplary multiple processors for parallel processing with dynamic load balancing. However, the present invention is not limited to two processors. A person skilled in the art may use a multi-core processor comprising more than two processors to practice the present invention. An exemplary system configuration to support dynamic load balancing is shown in FIGS. 3A-3C, where three configurations of functional partitioning are used to illustrate the operation of dynamic load balancing. FIG. 3A illustrates the first configuration where VLD 320 is assigned to CPU 0 while IQ/IT 330, PRED 340 and DBK 350 are performed by CPU 1. Beside Bitstream buffer 310 and Reference picture buffer 370, there is a need to store output from VLD 320. Therefore, VLD buffer 380 is used in FIG. 3A. Furthermore, FIG. 3A shows that the Output buffer 360 is used to store the deblocked video frame for displaying the video frame on a display screen. FIG. 3B illustrates the second configuration, where VLD 320 and IQ/IT 330 are performed using CPU 0 while PRED 340 and DBK 350 are performed using CPU 1. There is a need to store output from IQ/IT 330 and therefore, IQ/IT buffer 390 is used in FIG. 3B. FIG. 3C illustrates the third configuration, where VLD 320, IQ/IT 330 and PRED 340 are performed using CPU 0 while DBK 350 is performed using CPU 1. Each of the three configurations has different load shares between CPU 0 and CPU 1. For CPU 0, the first configuration has the lowest load and the third configuration has the highest load. On the other hand, for CPU 1, the first configuration has the highest load and the third configuration has the lowest load. The present invention may also be practiced using more or less than three configurations of functional partitioning. While the above example is based on a multi-core CPU, a multi-core DSP may also be used to practice the present invention. Furthermore, the present invention is also applicable to a multi-core processor that comprises one or more CPU cores and one or more DSP cores.

In any fixed configuration as shown in FIGS. 3A-3C, the execution time of each module may fluctuate depending on the underlying coding process and characteristics of associated video data. For example, the VLD module and the IQ module may require more processing time for higher bitrates or macroblocks with more residual signals. Also, the PRED module usually requires more processing time for the Inter-coded macroblock in a B-picture or B-slice than the Inter-coded macroblock in a P-picture or P-slice or the Intra-coded macroblock. The fixed functional partitioning will encounter the issue of load imbalance among different cores. Therefore, each configuration may cause a particular CPU to take more processing time than allowed for real-time processing. The dynamic load balancing according to the present invention will increase the overall system efficiency and accordingly decrease the possibility of processor overload (i.e., a processor consumes more time than allowed for real-time processing).

Dynamic load balancing is a technique that may alleviate the load imbalance issue by adaptively change the load configuration. For example, Y. Kim et al., (Y. Kim, J.-T. Kim, S. Bae, H. Baik and H. J. Song, "H.264 decoder on embedded dual core with dynamically load-balanced functional partitioning", *Proc. of IEEE Intl. Conf. on Multimedia and Expo* (ICME), pp. 1001-1004, April 2008) disclosed a dynamic load balancing method that divides the tasks of the next block among multiple processors for load balancing if the current block is an average block. This simple method had shown to improve performance of the multiple processors over a single processor. In another example, M. Kim et al., (M. Kim, J. Song, D. Kim and S. Lee, "H.264 decoder on embedded dual core with dynamically load-balanced functional partitioning", *Proc. of IEEE Intl. Conf. on Image Processing* (ICIP), pp. 3749-3752, September 2010) disclosed a dynamic load balancing method by checking the buffer level. If the buffer level is above a threshold, a load balancing flag is set by the first processor. If the load balancing flag is set, the first processor will perform one or more additional tasks to offload the processing originally performed by the second processor. If the macroblock is an Intra-MB, the first processor will perform the additional IQ/IT for the second processor. If the macroblock is not an Intra MB, the first processor will perform the additional Boundary Strength (BS) calculation for the second processor. In the above multiple processor system disclosed by M. Kim et al., a hardware accelerator (HWA) dedicated for motion compensation (MC) is used. However, the HWA will increase the chip cost and such HWA is not available in the multi-core CPU environment. Embodiments according to the present invention uses dynamic load balancing for low-cost implementation of video decoder based on a multi-core CPU, multi-core DSP or a mix of both without a HWA for MC. For the load configurations shown in FIGS. 3A-3C, embodiments according to the present invention may designate CPU 0 to dynamically select one of the three load configurations for each macroblock according to the queue level. If the queue level is low or empty, it implies that CPU 1 can finish its tasks quickly. Accordingly, CPU 0 should let CPU 1 share more loads by sending associated video data and indicating to CPU 1 using a flag regarding tasks to be performed by CPU 1. On the other hand, if the queue level is high, CPU 0 can offload some tasks from CPU 1 by sending associated video data and indicating to CPU 1 using a flag regarding tasks already performed by CPU 0.

Figure 3D:
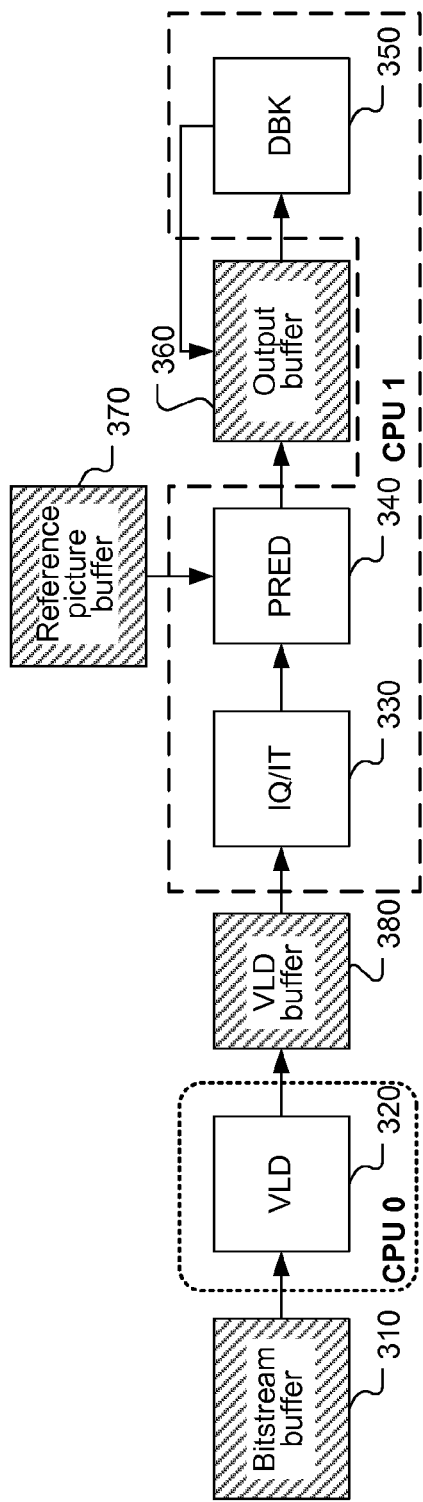
FIGS. 3D-3F illustrate alternative arrangements corresponding to the three examples in FIGS. 3A-3C respectively, where the output from PRED is written into the output buffer directly.
Figure 3E:
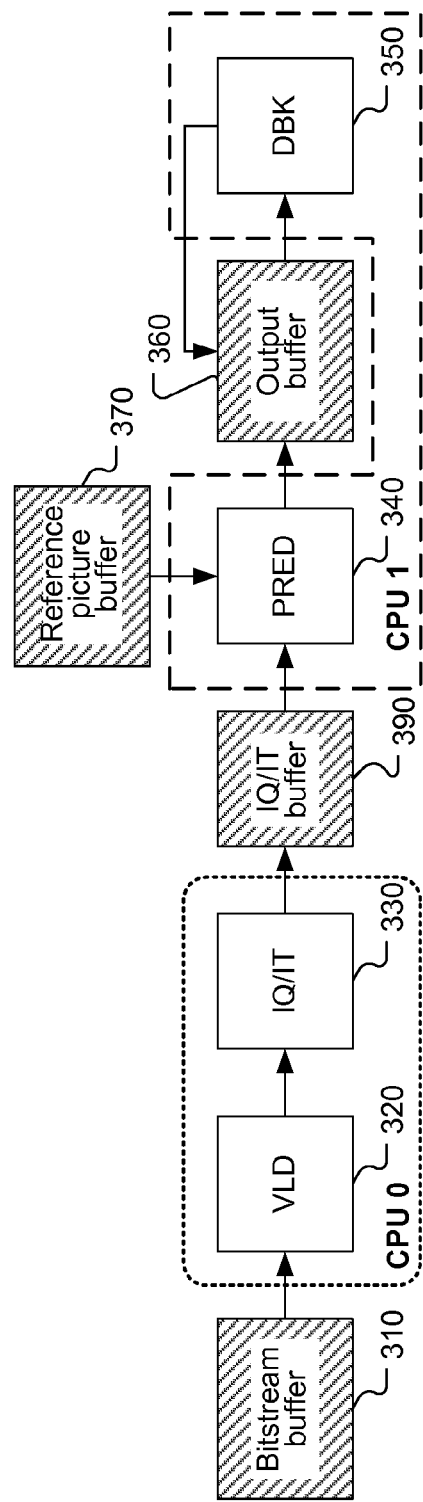
Figure 3F:
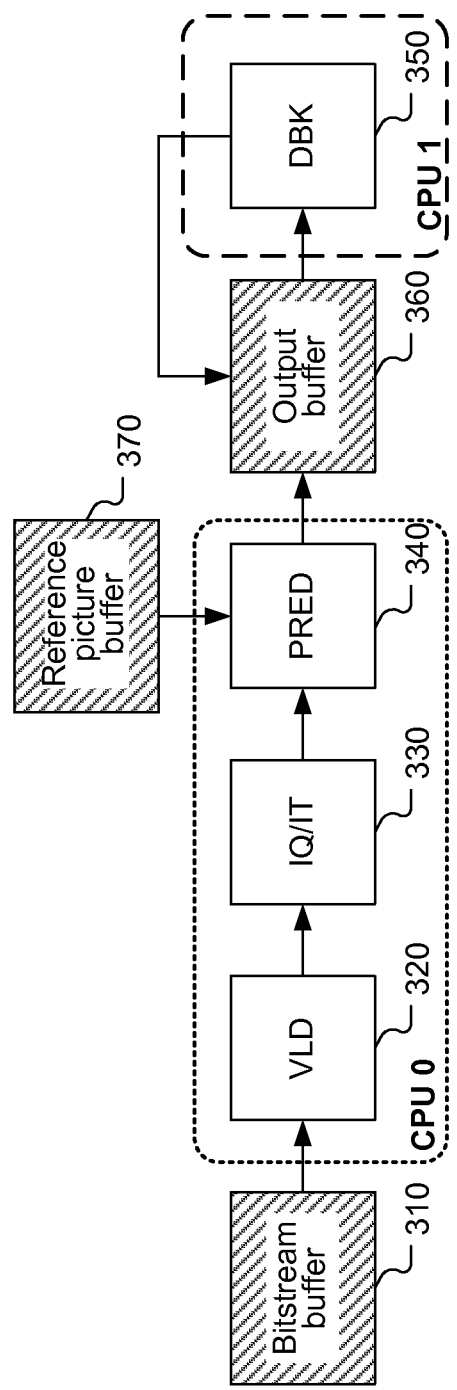

The video data passed from CPU 0 to CPU 1 can be macroblock based since the macroblock is a unit used for various coding process and has small granularity for adjusting load. Therefore, video data stored in the buffer queue can be based on macroblocks. Depending on the number of cores in the multi-core CPU or processor, as well as the load configuration, one or more buffer queues may be used. According to the present invention, each buffer queue comprises a series of buffer queue slots and each buffer queue slot includes a flag, macroblock header information and data associated with a macroblock. The flag can be used to indicate the processing status of the corresponding macroblock data. For example, the flag may indicate that the underlying macroblock at the output of CPU 0 is processed by VLD, VLD+IQ/IT or VLD+IQ/IT+PRED of FIGS. 3A, 3B and 3C respectively. CPU 1 then reads the flag to identify what task or tasks have been applied to the underlying macroblock by CPU 0. According to the flag, CPU 1 will apply IQ/IT+PRED+DBK, PRED+DBK or DBK to the macroblock respectively. To synchronize the queue level between the two cores, the queue index is calculated from the macroblock index and the queue level is synchronized by semaphores. In FIG. 3A through FIG. 3C, the output from PRED 340 is passed to DBK 350 for further processing. In an alternative arrangement, the output from PRED 340 may also be written into output buffer 360 directly. DBK 350 can read input from the output buffer 360 in this case. The alternative arrangements corresponding to FIG. 3A to FIG. 3C are shown in FIG. 3D to FIG. 3F respectively.

Figure 4A:
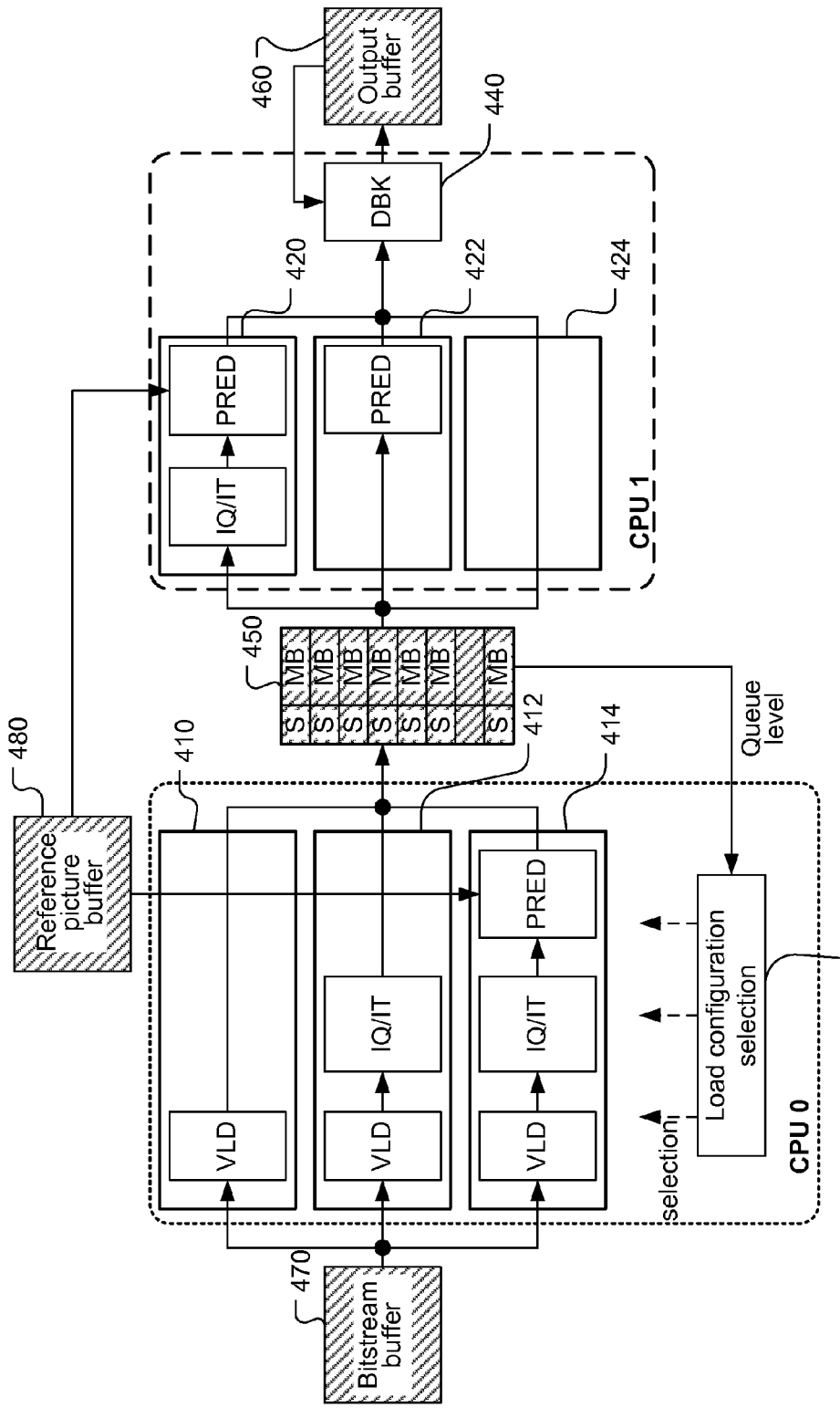
FIG. 4A illustrates an example of dynamic load balancing using a dual-core CPU according to an embodiment of the present invention.

FIG. 4A illustrates an embodiment of dynamic load balancing according to the present invention using a dual-core CPU. CPU 0 selects one out of three load configurations 410, 412 and 414 according to the queue level of the intercommunication buffer 450. Each slot of the intercommunication buffer 450 comprises a flag S and corresponding macroblock (MB) data. The queue level is used by CPU 0 for load balancing, such as selecting one of the three load configurations dynamically for each macroblock. As shown in FIG. 4A, the load configuration selection task 430 is performed by CPU 0. On the CPU 1 side, a corresponding load configuration is selected out of three load configurations 420, 422 and 424 according to the flag S. The DBK task 440 is always performed by CPU 1. The output buffer 460 is used to store decoded/deblocked video frame from DBK 440 for displaying the video frame on a display screen. The system shown in FIG. 4A also uses off-chip memory to support bitstream buffer 470 and reference picture buffer 480. Again, an alternative arrangement to let the PRED task write the output to the output buffer 460 directly may be used. When the PRED task is performed by CPU 0 (i.e., branch 414), the macroblock data output from the PRED of branch 414 will be written directly to the output buffer 460 as indicated by the arrowed line 416 in FIG. 4B. The S flag and macroblock header information will still be stored in the buffer queue 450 to coordinate tasks with with CPU 1.

Figure 4B:
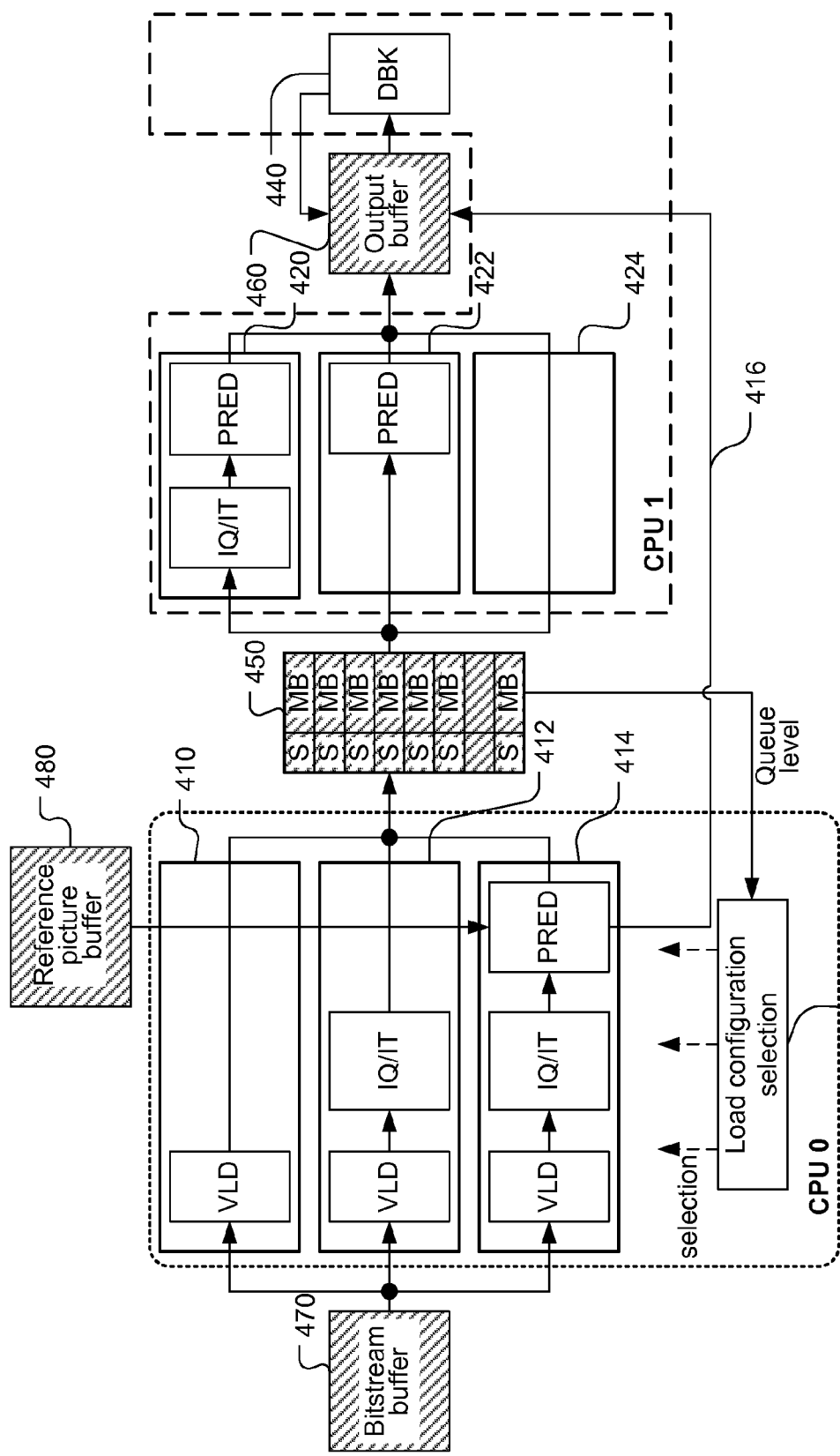
FIG. 4B illustrates another example of dynamic load balancing using a dual-core CPU according to an embodiment of the present invention, where the output from PRED in CPU 0 and CPU 1 is written to the output buffer directly.

The queue size of the intercommunication buffer 450 in FIG. 4A and FIG. 4B should be less than a macroblock row so that the data dependencies need not to be checked so as to reduce the synchronization overhead. Otherwise, CPU 0 and CPU 1 may have to synchronize the access to the intercommunication buffer 450. Therefore, a smaller queue size, such as half a macroblock row, can ensure top-left, top and top-right macroblock are already done when queue is available to push or pop. Another advantage of the small queue size is to reduce the external memory bandwidth and latency, which is important especially in embedded system. As an example, the queue size for a 720p decoder can be 32 macroblocks.

For H.264 standard, motion vector prediction technique is used to further reduce bitrate associated with motion vectors. The motion vector for a current macroblock can be recovered based on decoded motion vectors of the neighboring macroblocks and the motion vector difference (MVD) carried in the bitstream. For Intra prediction, the reconstruction of pixels in a current block depends on the neighboring pixels above the upper boundary and to the left side of the left boundary of the current macroblock. If both the MVD and the Intra mode prediction are performed in the PRED module, the VLD will have to wait for the PRED module to complete. In an embodiment according to the present invention, the motion vector prediction and intra mode prediction are calculated together with VLD so that the VLD can be performed without the need of waiting for PRED to complete.

Figure 5A:
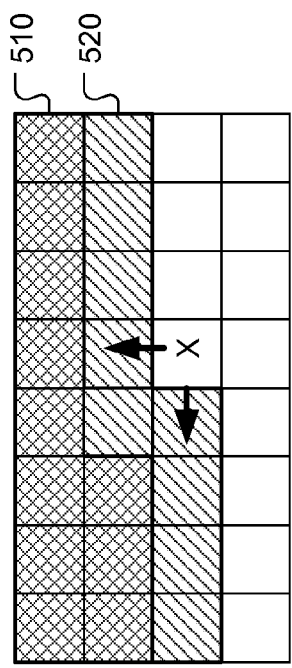
FIG. 5A illustrates an example of decoding process associated with Intra prediction and deblocking, where deblocking process is delayed by one macroblock row with respect to the Intra prediction process.
Figure 5B:
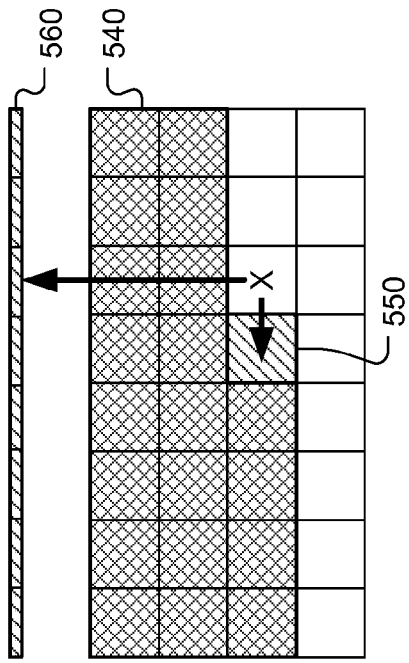
FIG. 5B illustrates an example of decoding process associated with Intra prediction and deblocking, where a pixel line buffer is used and deblocking process is delayed by one macroblock with respect to the Intra prediction process.
Figure 5C:
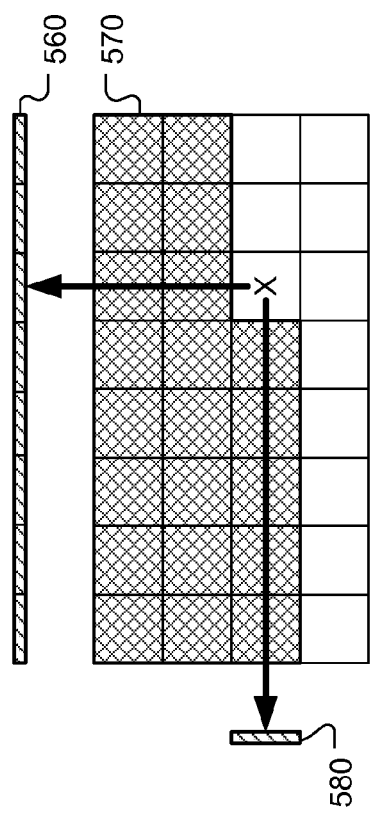
FIG. 5C illustrates an example of decoding process associated with Intra prediction and deblocking, where a pixel buffer for the PRED processed macroblock on the left is used and deblocking process does not need to delay.

In the H.264 standard, the Intra prediction needs to reference the PRED processed results on the top macroblock row before the DBK process. FIG. 5A illustrates an example of DBK process where the DBK process is always delayed by one macroblock row. Each small square in FIG. 5A indicates a macroblock. The cross-line shaded squares in area 510 indicate the macroblocks already processed by DBK and the slant-line shaded squares in area 520 indicate the macroblocks processed by PRED. For the current macroblock marked as "X" in FIG. 5A, the PRED process requires pixels from the PRED processed (i.e., pre-DBK) macroblock above and the PRED processed (i.e., pre-DBK) macroblock to the left of the current macroblock X. In one embodiment according to the present invention, the DBK process is delayed by one macroblock row or more with respect to the PRED process. In other words, the buffer queue will hold PRED processed data (i.e., pre-DBK data) corresponding to one macroblock-row worth or more so that the PRED processed macroblocks for the left and the above macroblocks are available for the PRED operation of the current macroblock X. FIG. 5A illustrates an example that the macroblocks delayed corresponding to the one above the current macroblock through the macroblock to the left of the current block. A macroblock row-worth data can cover the picture width. FIG. 5B illustrates another arrangement according to the present invention for implementing Intra prediction and DBK efficiently. A pixel buffer 560 is used to store the PRED processed data of the bottom row of each macroblock for preceding macroblocks corresponding to one macroblock-row less one macroblock worth or more. In FIG. 5B, the cross-line shaded squares in area 540 indicate the macroblocks processed by DBK and the slant-line shaded square in area 550 indicates the macroblock processed by PRED. The current macroblock X can be processed by PRED using the PRED processed data of the above macroblock, which is stored in the pixel buffer 560, and the PRED processed data on the left (i.e., macroblock 550). The bottom rows for the macroblocks from the macroblock above the current macroblock to the macroblock before the left macroblock 550 are buffered in the pixel buffer 560. Since the left macroblock 550 is also needed for the PRED process of the current macroblock, the PRED processed left macroblock 550 can be stored in a buffer until the PRED process for the current macroblock is complete. Therefore, the bottom row of the left macroblock 550 does not have to be stored in the pixel buffer 560 until after the current macroblock is PRED processed. Therefore, the pixel buffer 560 has to store the bottom row of each macroblock for preceding macroblocks corresponding to one macroblock-row less one macroblock. After the current macroblock is PRED processed, the macroblock on the left is ready for DBK process. In the example of FIG. 5B, the DBK process can be performed with one macroblock delay with respect to the PRED process. In yet another embodiment of the present invention, a pixel buffer 580 may be used to store the PRED processed data on the left as shown in FIG. 5C. Therefore, there is no need to delay the DBK processing. In FIG. 5C, the area 570 indicates the deblocked macroblocks.

Since the Intra prediction also needs to reference the PRED result of the left macroblock, an embodiment according to the present invention will configure the load to ensure that the PRED process for the left macroblock is performed in the same thread. If CPU 0 performs PRED for an Intra macroblock and then transfers to CPU 1 to perform PRED for a following Intra macroblock, it may cause some issues. For example, when CPU 0 transfers PRED of an Intra macroblock to CPU 1, it implies that the PRED of the macroblock on the left is already done by CPU 1. Therefore, the PRED of the current macroblock in CPU 1 can reference the correct pixel from the macroblock on the left. However, after transferring to CPU 1, the PRED of the Intra macroblock cannot transfer back to CPU 0 because CPU 0 does not know whether PRED of the macroblock on the left is done by CPU 1 or not. According to an embodiment of the present invention, once CPU 0 assigns the PRED process of a current Intra macroblock to CPU 1, the PRED process for the following Intra macroblocks of the same macroblock row will be assigned to CPU 1. If the following macroblock is in the Inter mode, the macroblock may be assigned to the same CPU or a different CPU.

As mentioned earlier, embodiments according to the present invention dynamically adjust the load among processors according to the queue level of the intercommunication buffer. The load configuration selection task 430 as shown in FIG. 4A and FIG. 4B can be used to dynamically adjust the load among processors. For example, one or more threshold levels can be used to determine the load configuration for the multiple processors. FIG. 6A illustrates an example of two threshold levels for selecting one of the three load configurations for Inter macroblock. The queue level 620 of the intercommunication buffer 610 is read. Two thresholds, THR1 622 and THR2 624 are selected. If the queue level is low, it implies that CPU 1 can process the tasks quickly. Therefore, CPU 0 can offload more tasks to CPU 1. Accordingly, according to one embodiment of the present invention, CPU 0 will only perform VLD process on an underlying macroblock and let CPU 1 perform IQ/IT, PRED and DBK tasks if the queue level 620 is below THR1 622. Therefore, the load configuration selection 430 will select load configuration 410. If the queue level 620 is above THR1 622, but below THR2 624, CPU 0 will perform both VLD and IQ/IT tasks and let CPU 1 perform PRED and DBK tasks. Therefore, the load configuration selection 430 will select load configuration 412. If the queue level 620 is above THR2 624, CPU 0 will perform VLD, IQ/IT and PRED tasks and let CPU 1 perform the DBK task only. Therefore, the load configuration selection 430 will select load configuration 414. The thresholds THR1 622 and THR2 624 can be properly designed to achieve high efficiency. For example, THR1 622 can be set to ⅓ and THR2 624 can be set to ⅔. Other thresholds may also be used to practice the present invention.

For the Intra macroblocks, the thresholds can be different from the thresholds for the Inter macroblocks. For example, the two thresholds, THR1 632 and THR2 634 for an Intra macroblock can be set to ⅓ and ½ respectively as shown in FIG. 6B. As mentioned before, once CPU 0 assigns the PRED process for a current Intra macroblock to CPU 1, the PRED process for the following Intra macroblocks of the same macroblock row will be assigned to CPU 1 according to an embodiment of the present invention. In this case, the load configuration selection 430 only needs to allocate the VLD and IQ/IT tasks between the two CPUs. FIG. 6C illustrates an example of load configuration for this case, where a single threshold, THR1 642 is used to determine load configuration. Therefore, CPU 0 will perform VLD process on an underlying macroblock and let CPU 1 perform IQ/IT, PRED and DBK tasks if the queue level 640 is below THR1 642. If the following macroblock is in the Inter mode, the macroblock may be assigned to the same CPU or a different CPU. If the queue level 640 is above THR1 642, CPU 0 will perform both VLD and IQ/IT tasks and let CPU 1 perform PRED and DBK tasks. In another embodiment of the present invention, the thresholds for the Intra macroblock and the Intra macroblock can be the same. For example, the threshold 624 for an Inter macroblock in FIG. 6A and the threshold 634 for an Intra macroblock in FIG. 6B can be the same.

In order to evaluate the performance of a multi-core system incorporating an embodiment of the present invention, performance assessment based on a multi-core hardware simulation environment is used. The simulation environment is configured for a dual-core processor. The threading and synchronization are based on Linux pthread API, including pthread_xxx( ), sem_xxx( ), pthread_mutex_xxx( ).

The decoding software is configured to support H.264 high profile bitstream with Context-adaptive binary arithmetic coding (CABAC). A total of 20 test bitstreams is used and the bitstreams correspond to video at the resolution of 1280×720 pixels and an average of 166 frames per bitstream.

Figure 7:
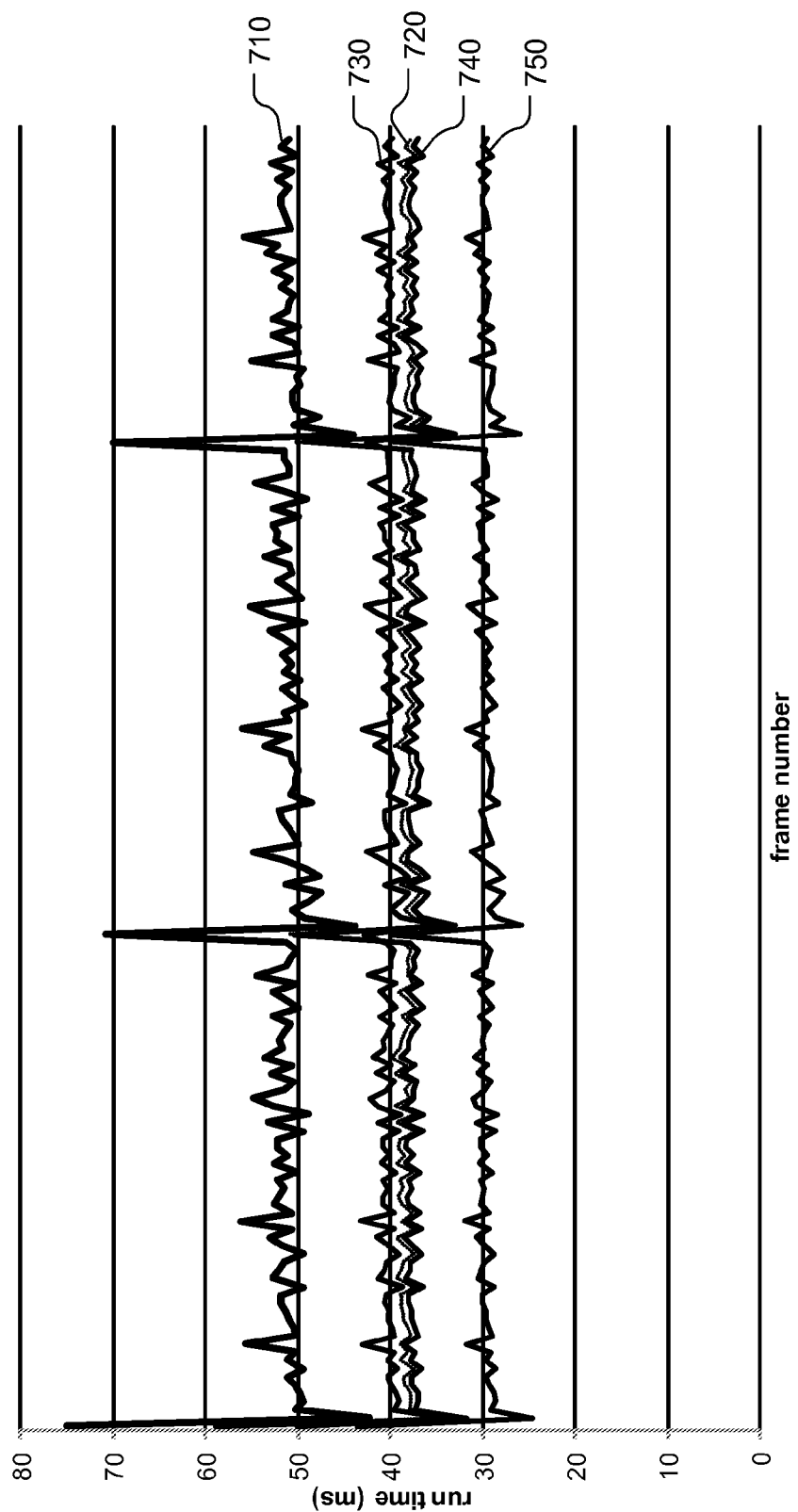
FIG. 7 illustrates performance comparison in terms of run time among a single processor system, three dual-core systems with fixed load configuration and a dual-core system with dynamic load balancing incorporating an embodiment of the present invention.

FIG. 7 illustrates a performance comparison among a single processor, a dual-core processor with fixed load configurations, and a dual-core with dynamic load balancing according to an embodiment of the present invention. For a typical bitstream, the performance (run time per picture) of the three fixed functional partitions corresponding to FIGS. 3A-3C are shown by respective curves 720-740. Compared with the single processor system (curve 710), the average speed-up factors are 1.34, 1.28 and 1.37 times for FIGS. 3A-3C respectively. On the other hand, the average speed-up factor for the dual-core system with dynamic load balancing according to the present invention (curve 750) is 1.73 times, which is better than any fixed load configuration.

Figure 8:
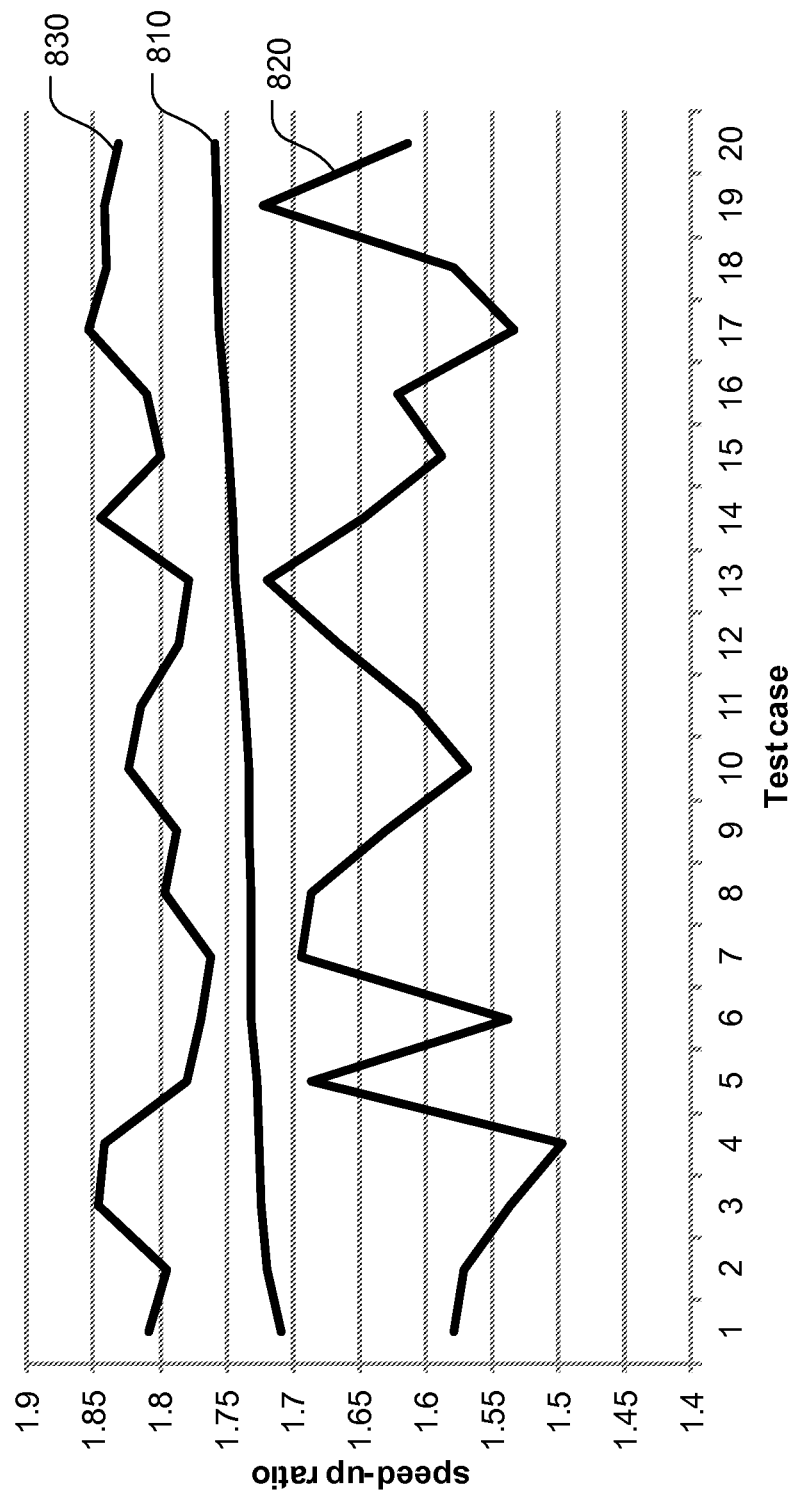
FIG. 8 illustrates the minimum, average and maximum speed-up ratios of the dual-core system with dynamic load balancing incorporating an embodiment of the present invention for 20 test cases.
Figure 9:
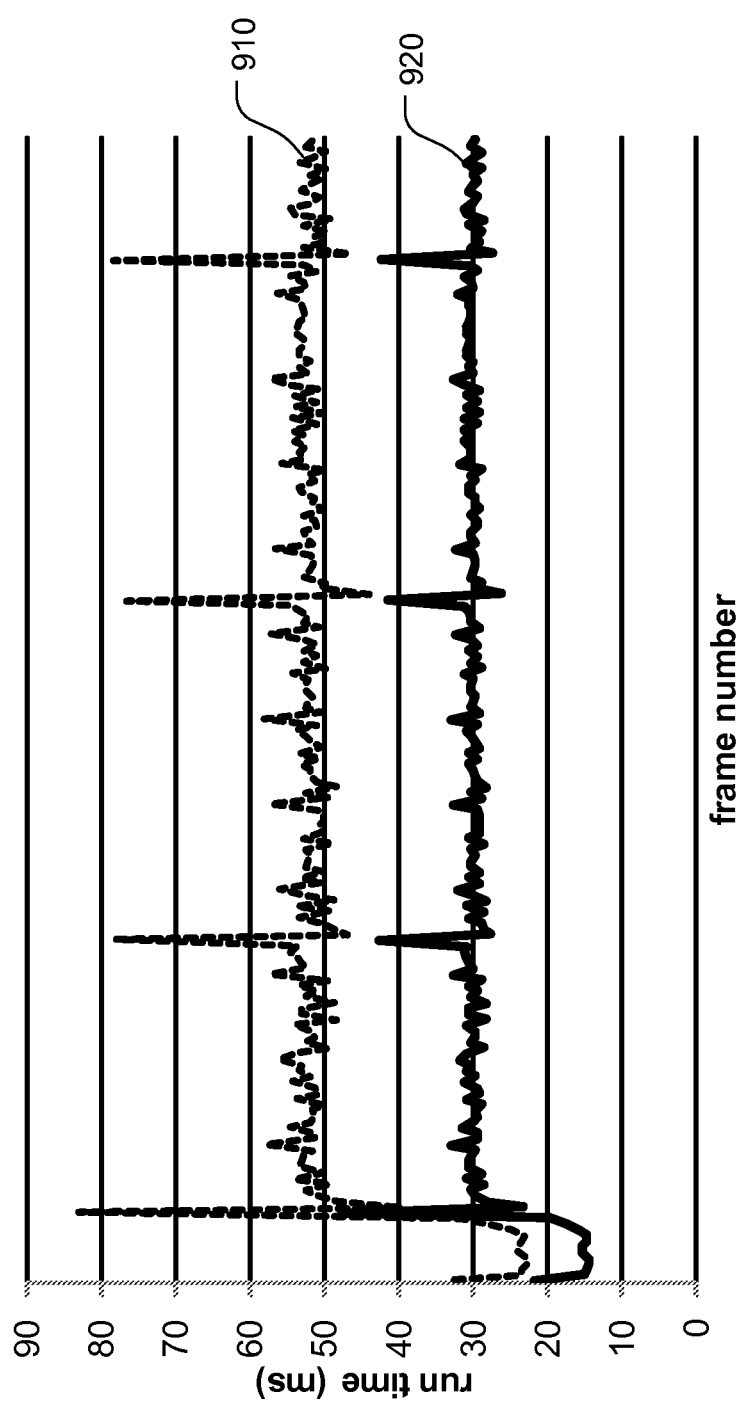
FIG. 9 illustrates performance comparison in terms of run time between a single processor system and a dual-core system with dynamic load balancing incorporating an embodiment of the present invention for a test case containing simple content at the beginning of the sequence.

FIG. 8 illustrates the average (curve 810), minimum (curve 820) and maximum (curve 830) speed-up ratio of all 20 test cases. The average speed-up ratio over all test cases is 1.74 times. The minimum speed-up ratio is 1.49 times among all test frames. A close examination of these frames reveals that these frames are associated with very simple contents at the beginning of the sequence. FIG. 9 illustrates the run times for this sequence corresponding to a single processor system (curve 910) and the dual-core system incorporating dynamic load balancing according to an embodiment of the present invention (curve 920). The run times for the first few frames are very low, as shown in FIG. 9.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The software code may be configured using software formats such as Java, C++, XML (eXtensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention. The software code may be executed on different types of devices, such as laptop or desktop computers, hand held devices with processors or processing logic, and also possibly computer servers or other devices that utilize the invention. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video decoding using multiple processors with dynamic load balancing, the method comprising:
   determining multiple processing modules associated with decoding a video bitstream, wherein the multiple processing modules comprise distinct processing modules including a prediction module;
   configuring said multiple processors to perform the multiple processing modules by mapping the multiple processing modules to said multiple processors, wherein one or more buffer queues are used among said multiple processing modules; and
   wherein said multiple processors comprise a first processor configured to generate output data to said one or more buffer queues and a second processor configured to retrieve input data from said one or more buffer queues, wherein said mapping the multiple processing modules to said multiple processors is based on multiple load configurations, wherein switching among the multiple load configurations is based on the level of said one or more buffer queues.

2. The method of claim 1, wherein the prediction module comprises an intra prediction sub-module, an inter prediction sub-module, motion vector determination and intra mode determination.

3. The method of claim 2, wherein said mapping the prediction module to said multiple processors is based on different levels of said one or more buffer queues.

4. The method of claim 1, wherein output data after processing by the prediction module is stored in said one or more buffer queues.

5. The method of claim 1, wherein said decoding the video bitstream is performed on a macroblock basis.

6. The method of claim 5, wherein the multiple processing modules comprise a Variable Length Decoder (VLD) module, and wherein motion vector determination and intra mode determination of the prediction module and the VLD module associated with each macroblock are performed on a same processor of said multiple processors.

7. The method of claim 5, wherein the multiple processing modules comprise a deblocking module to perform deblocking process on video data processed by the prediction module, wherein intra prediction of the prediction module refers to the video data above each macroblock processed by the prediction module before the deblocking process, and the deblocking module is performed on each macroblock later than the prediction module by at least one macroblock.

8. The method of claim 5, wherein the multiple processing modules comprise a deblocking module to perform deblocking process on video data processed by the prediction module, wherein intra prediction of the prediction module refers to the video data above each macroblock processed by the prediction module before the deblocking process, wherein previous pixels processed by the prediction module are backed up before the deblocking module is performed on each macroblock, and wherein the previous pixels comprise bottom pixels of proceeding macroblocks and a number of proceeding macroblocks is at least one macroblock row.

9. The method of claim 5, wherein if an intra macroblock is assigned to one of said multiple processors, all subsequent intra macroblocks of said the intra macroblock in a same macroblock row are assigned to said one of said multiple processors.

10. The method of claim 1, wherein the multiple load configurations comprise a first load configuration, a second load configuration and a third load configuration, wherein the first load configuration assigns a Variable Length Decoder (VLD) module to one processor, the second load configuration assigns the VLD module, an Inverse Quantization (IQ) module and an Inverse Transform (IT) module to said one processor, and the third load configuration assigns the VLD module, the IQ module, the IT module and the prediction module to said one processor.

11. The method of claim 1, wherein said multiple processors correspond to a multi-core Central Processing Unit (CPU) comprising of multiple CPUs or a multi-core Digital Signal Processor (DSP) comprising of multiple DSPs.

12. The method of claim 1, wherein the multiple processing modules comprise an Inverse Quantization (IQ) module and an Inverse Transform (IT) module.

13. A non-transitory computer readable medium storing a computer program for decoding a video bitstream using multiple processors with dynamic load balancing, the computer program comprising sets of instructions for:
- determining multiple processing modules associated with decoding the video bitstream, wherein the multiple processing modules comprise distinct processing modules including a prediction module;
- configuring said multiple processors to perform the multiple processing modules by mapping the multiple processing modules to said multiple processors, wherein one or more buffer queues are used among said multiple processing modules; and
- wherein said multiple processors comprise a first processor configured to generate output data to said one or more buffer queues and a second processor configured to retrieve input data from said one or more buffer queues, wherein said mapping the multiple processing modules to said multiple processors is based on multiple load configurations, wherein switching among the multiple load configurations is based on the level of said one or more buffer queues.

14. The non-transitory computer readable medium of claim 13, wherein the prediction module comprises an intra prediction sub-module, an inter prediction sub-module, motion vector determination and intra mode determination.

15. The non-transitory computer readable medium of claim 14, wherein said mapping the prediction module to said multiple processors is based on different levels of said one or more buffer queues.

16. The non-transitory computer readable medium of claim 13, wherein output data after processing by the prediction module is stored in said one or more buffer queues.

17. The non-transitory computer readable medium of claim 13, wherein said decoding the video bitstream is performed on a macroblock basis.

18. The non-transitory computer readable medium of claim 17, wherein the multiple processing modules comprise a variable Length Decoder (VLD) module, and wherein motion vector determination intra mode determination of the prediction module and the VLD module associated with each macroblock are performed on a same processor of said multiple processors.

19. The non-transitory computer readable medium of claim 17, wherein the multiple processing modules comprise a deblocking module to perform deblocking process on video data processed by the prediction module, wherein intra prediction of the prediction module refers to the video data above each macroblock processed by the prediction module before the deblocking process, and the deblocking module is performed on each macroblock later than the prediction module by at least one macroblock.

20. The non-transitory computer readable medium of claim 17, wherein the multiple processing modules comprise a deblocking module to perform deblocking process on video data processed by the prediction module, wherein intra prediction of the prediction module refers to the video data above each macroblock processed by the prediction module before the deblocking process, wherein previous pixels processed by the prediction module are backed up before the deblocking module is performed on each macroblock, and wherein the previous pixels comprise bottom pixels of proceeding macroblocks and a number of proceeding macroblocks is at least one macroblock row.

21. The non-transitory computer readable medium of claim 17, wherein if an intra macroblock is assigned to one of said multiple processors, all subsequent intra macroblocks of said the intra macroblock in a same macroblock row are assigned to said one of said multiple processors.

22. The non-transitory computer readable medium of claim 13, wherein the multiple load configurations comprise a first load configuration, a second load configuration and a third load configuration, wherein the first load configuration assigns a variable Length Decoder (VLD) module to one processor, the second load configuration assigns the VLD module, an Inverse Quantization (IQ) module and an Inverse Transform (IT) module to said one processor, and the third load configuration assigns the VLD module, the IQ module, the IT module and the prediction module to said one processor.

23. The non-transitory computer readable medium of claim 13, wherein said multiple processors correspond to a multi-core Central Processing Unit (CPU) comprising of multiple CPUs or a multi-core Digital Signal Processor (DSP) comprising of multiple DSPs.

24. The non-transitory computer readable medium of claim 13, wherein the multiple processing modules comprise an Inverse Quantization (IQ) module and an Inverse Transform (IT) module.

* * * * *